United States Patent [19]

Jayawant et al.

[11] 3,959,445

[45] May 25, 1976

[54] HIGHLY ABSORBENT, LOW BULK DENSITY SODIUM SILICATE

[75] Inventors: Madhusudan D. Jayawant, Hockessin; Paul C. Yates, Talleyville, both of Del.

[73] Assignee: E. I. Du Pont de Nemours and Company, Wilmington, Del.

[22] Filed: Dec. 19, 1973

[21] Appl. No.: 425,970

Related U.S. Application Data

[63] Continuation-in-part of Ser. No. 355,498, April 30, 1973, abandoned.

[52] U.S. Cl. .............................. 423/332; 252/135
[51] Int. Cl.[2] ......................................... C01B 33/32
[58] Field of Search ........................... 423/332, 333; 23/313 AS; 264/42, 51, 53; 252/99, 135; 106/75

[56] References Cited
UNITED STATES PATENTS

| | | | |
|---|---|---|---|
| 3,095,312 | 6/1963 | Holmes ............................ | 264/42 X |
| 3,579,299 | 5/1971 | Sams et al. ...................... | 423/332 |
| 3,687,640 | 8/1972 | Sams et al. ...................... | 23/313 |
| 3,748,103 | 7/1973 | Bean et al. ...................... | 423/332 |
| 3,868,227 | 2/1975 | Gericke et al. ................... | 423/332 |

FOREIGN PATENTS OR APPLICATIONS

| | | | |
|---|---|---|---|
| 1,045,682 | 10/1966 | United Kingdom ............... | 423/332 |
| 40,766 | 4/1958 | Poland ............................ | 423/332 |

*Primary Examiner*—Edward J. Meros

[57] ABSTRACT

Spheroidal aggregates of highly absorbent, low bulk density, readily soluble, high surface area, hydrated, amorphous alkali metal silicate are provided by contacting discrete alkali metal silicate particles with an aqueous solution of hydrogen peroxide, absorbing the peroxide into the alkali metal silicate hydrated structure and heating the silicate to destroy substantially all of the hydrogen peroxide.

7 Claims, No Drawings

HIGHLY ABSORBENT, LOW BULK DENSITY SODIUM SILICATE

CROSS REFERENCE TO RELATED APPLICATION

This application is a continuation-in-part of our co-pending application Ser. No. 355,498, filed April 30, 1973, now abandoned.

BACKGROUND OF THE INVENTION

There is an increasing need in modern technology for high surface area, rapidly soluble, hydrated alkali metal silicate solid materials. Such products find utility as binders for "gunning mixes" of refractory powders. In steel making furnaces such as basic oxygen furnaces, open hearth furnaces, and electrical furnaces, erosion occurs in particular areas of the furnace due to a combination of heat, chemical corrosion, and the abrasive solid materials which are melted in the furnace. Prior to the advent of suitable patching compounds called "gunning mixes", it was necessary to halt production of these furnaces and rebuild them when this erosion proceeded to a substantial degree. Now, however, these furnaces can be patched with refractory grain which is shot into the molten furnace along with a binder in aqueous solution. This mixture adheres to the walls and patches the eroded areas, thus avoiding the necessity of furnace shutdown. In many instances a high rate of solution of the binder in water is critical since the dry binder powder is shot through a nozzle and sprayed with water immediately as it leaves the nozzle. The powder wet by water is propelled by air pressure into the white-hot furnace and hits the walls where it adheres to form the patch. It is vital for the success of this operation that the binder sodium silicate go into solution with extreme radidity, since the total contact time is exceedingly short. While existing spray-dried hydrated sodium silicates perform reasonably well in this application, an even more rapidly soluble powder is desired.

In another application, modern detergent formulations which do not contain phosphate, do contain much larger quantities of nonionic surfactants than previous phosphate formulations. Nonionic surfactants are desirable in such applications, since they are not sensitive to the calcium and magnesium ions present in hard waters and are not precipitated or inactivated by them. It is difficult, however, to supply the nonionic surfactant by spray drying in a spray-drying tower, as is conventional with formulating detergent compositions. This is because the liquid nonionic is steam distilled by the water in the mixture which is spray-dried and escapes from the composition creating a severe air pollution problem. There is therefore a need for highly absorbent powders, preferably of constituents which would normally be present in detergents, and which are ecologically acceptable. Thus, highly absorbent alkali metal silicate powders can be very helpful in formulating such compositions by allowing the nonionic detergent to be absorbed into its structure. Subsequently, the carrier silicate can be post-blended with the other constituents which have ben spray-dried, thereby avoiding putting the nonionic liquid through the spray tower and thus avoiding air pollution. Unfortunately, existing water-soluble alkali metal silicate powders such as spray-dried sodium silicate, have little or no absorbency.

Finally, it is desirable to prepare very low bulk density refractory powders of silica for use as catalyst supports and as insulating materials.

Existing hydrated alkali metal silicates, such as spray-dried sodium silicate, have large particle sizes; low porosity, relatively low surface area, ranging around one square meter per gram; a relatively high bulk density ranging around 0.6 gram/cc. and a low absorbency. Such materials generally absorb a maximum of only 10% by weight of nonionic surfactant without experiencing typical caking problems.

Canadian Pat. No. 917,884 issued on Jan. 2, 1973 to Robert H. Sams et al. discusses a method for making crystallized alkaline sodium silicates by reacting silicon with water in the presence of alkaline sodium silicate to produce hydrogen and form bubbles in the crystallizing mass. Even when such a process is used, the absorbency of the silicate product is only about 3.3% of its weight.

Techniques for agglomerating discrete particles of spray dried sodium silicate powders into aggregates having a somewhat larger size and lower bulk density have been described, for example, in U.S. Pat. No. 3,687,640 issued on Aug. 29, 1972 to Robert H. Sams et al. Although such techniques do lead to agglomeration and cause some reduction in bulk densities, the surface area and rate of solution are not thereby increased, nor are the bulk densities lowered sufficiently since bulk densities of less than 0.3 g./cc. are not thus attained.

Graining hydrated sodium silicate glasses is another technique employed to prepare sodium silicate powder. However, because of the somewhat plastic nature of sodium silicate, it is difficult to prepare finely divided hydrated sodium silicate when a grinding technique is used. In addition, a silicate thus produced tends to be dense and irregular, typically having high bulk densities on the order of 1 to 1.4 g./cc. and an absorbency of only about 10% by weight based on its own weight of nonionic detergents before caking occurs.

U.S. Pat. No. 3,177,147 issued on Apr. 6, 1965 to B. B. Dugan discloses the preparation of complex detergent compositions which may contain sodium silicate. In the method outlined, a completed detergent formulation is mixed with water and an oxygen-liberating compound to form a paste capable of retaining small oxygen bubbles without coalescing. Minimal mixing is carried out in order to lose as little of the oxygen from the per compound as possible from the paste mass. The oxygen is liberated from the per compound in sufficient amounts to both bleach and expand the paste until the paste is at least twice its initial volume. The paste is allowed to set by the absorption of water to make hydrates of the various builder and filler salts such as sodium sulfate and sodium phosphate which are introduced in an anhydrous form or in a lower state or hydration. The set paste is a friable mass which is then granulated. Such a process for treating detergent compositions does not yield excellent results when used with a sodium silicate along since silicates tend to agglomerate once they lose their free-flowing state and form a paste. As a result, the mass or heat transfer necessary to cause the evolution of volatiles ($H_2O$ and $H_2O_2$) becomes impossible, particularly at a sufficiently rapid rate to avoid non-uniform, relatively non-porous structures. In such instances, water can be removed rapidly at the surface of such a large coalesced mass of material, but the anhydrous skin which forms is a very good insulating barrier to minimize further heat and mass transfer. Under such conditions, it is found that one may heat for hours, achieving a completely anhydrous outer surface, while the interior of the expanded structure is still moist. Not only is such a highly heterogeneous structure undesirable in terms of product uniformity, but rates of drying overall are quite slow and the competing process of sintering proceeds to an excessive degree, forming a product with an unsatisfactory amount of absorption.

Other methods for using hydrogen peroxide and silicates in other complex formulations have been disclosed in the prior art. British Pat. No. 996,563 issued on June 30, 1965 to Bedrich Cibulka, for example, discloses a method for preparing pre-cast building materials wherein a silicate, an inert inorganic filler, a hardening agent to accelerate the setting of the mixture, hydrogen peroxide, elementary iron and a copolymer are fashioned into a paste and shaped in a mold. Such a process yields a water insoluble material that is useless in detergent formulations. The product is also devoid of residual binding affinity and useless as a gunning mix. Clearly, the product is not an amorphous silicate.

SUMMARY OF THE INVENTION

It has now been found that spheroidal aggregates of highly absorbent, low bulk density, readily soluble, highly porous, high surface area, hydrated, amorphous alkali metal silicate granules and powders can be prepared which answer the needs of the art. The unique silicates of this invention are prepared by contacting essentially discrete alkali metal silicate particles with aqueous solutions of hydrogen peroxide, absorbing the peroxide into the alkali metal silicate hydrated structure and heating the silicate to destroy substantially all of the hydrogen peroxide, thereby causing the silicate to swell and form a high surface area, more absorbent, aggregated structure. The silicate may be a compound of $SiO_2$ and any suitable alkali metal oxide including, for example, sodium oxide, potassium oxide, lithium oxide and the like at a mol ratio of $SiO_2$:alkali metal oxide of 1:1 to 3.75:1, preferably 2:1 to 3:1 and sodium silicates are preferred.

DETAILED DESCRIPTION OF THE INVENTION

The Products

Stereoscan electron micrographs show that the products of this invention are composed of minute grape-like clusters of spheroidal particles which form absorbent aggregates. The specific surface area of the silicates of this invention as measured by nitrogen absorption lies between 2.5 and 7 m.$^2$/g. compared to values of 1 m$^2$/g. and less, which are characteristic of spray-dried or ground hydrated alkali metal silicates. The higher surface areas of the products of this invention lead to much more rapid rates of solution.

The products of the invention are also characterized by very low bulk densities. While the bulk density will depend somewhat on the bulk density of the starting powder and the amount of hydrogen peroxide used in treating it, values of less than 0.5 g./cc. and preferably less than 0.3 g./cc. are obtained.

The alkali metal silicates of this invention have a high degree of absorbency for nonionic surfactant and absorb from 35% by weight of nonionic based on the weight of the silicate to 400% by weight, preferably from 70% to 400%. The degree of absorbency may be measured by adding nonionic surfactant slowly to a weighed amount of the silicate in a glass container, stirring after each addition. The percentage of the nonionic surfactant that can be added before the glass becomes wet with surfactant is the percent absorption; the mix is free-flowing at this point.

It should be understood that the absorption capacity of the products of the invention or other absorbent materials are to some degree determined by kinetic factors as well as the absolute porosity and degree of openness of pores in the structure. Absorption, like other physical and chemical processes, is not necessarily instantaneous and finite periods of time are required for the liquids to be absorbed to penetrate from the outer edges of the absorbing particles into the interior. This process is more rapid for larger pores and, as a consequence, the surfactant on the side of the beaker test just described, tends to measure pores of the general size range of 100 microns to about 5 micron. The capacity of the products of this invention for absorption considerably exceeds that measurable by this test since the smaller pores in the structure also can be filled if sufficient time is allowed. The very free-flowing characteristics of the products of this invention derive in part from this large reservoir of absorptive capacity in the form of finer pores. After an apparently saturation amount of the liquid has been added, the product will continue to improve in flowability with the passage of time as these smaller pores are gradually filled.

A more accurate measure of the true absorption capacity can be obtained by measuring the total pore volume and pore diameters by mercury porosimetry measurements. A mercury porosimeter is used to measure pore volume and pore diameters in such a case. This is a device which forces mercury under pressure into the pores of a porous material. The smaller the pore diameter, the higher the pressure of mercury required to penetrate and fill the pore. From 0.7 cc. to 5.0 cc. of mercury is absorbed per gram of hydrated alkali metal silicate of this invention at pressures of about 15,000 psi, corresponding to an average pore diameter of 0.02 micron. At least half of the total porosity of the products of this invention will have a pore diameter between 10 microns and 0.02 micron.

The silicates of this invention at a comparable water content dissolve in water under equivalent conditions of agitation and temperature at a rate at least twice that of the precursor powders from which they are prepared. Stated in quantitative terms, at least 90% of the particles totally dissolve in 100 cc. of water in 5 minutes at 25°C. The rate of solution can be determined by dissolving a one gram sample in 100 ml of water, filtering after a specified time, and titrating with a mineral acid to determine the dissolved alkalinity. Another factor which is of some importance is the percentage remaining undissolved. If the insolubles are too high in a detergent composition, they show up as white specks on dark clothing. For this reason, more than 90% should dissolve and preferably more than 99.5% at concentrations which are comparable to those normally encountered when detergents are used or approximately 1 to 50 grams of silicate for each 16 gallons of water.

The silicate products of this invention have a final water content of no greater than 25% by weight of water and an active oxygen content of no more than 1.33% by weight. Preferably, the active oxygen content is much lower and should be below 0.5% by weight. In other words, any active oxygen present would remain essentially as an impurity because hydrogen peroxide is one of the starting materials used in the practice of the invention. The negligible active oxygen is important since appreciable amounts of active oxygen may adversely effect the chemical properties and reactivities of the compositions in which the silicates are used. For example, in gunning mixes the presence of air bubbles, dirt, oxide residues, moisture and so on at the boundary layer reduces adhesive and cohesive strength considerably and an appreciable active oxygen content in the composition would result in the evolution of oxygen bubbles at the temperature of application.

On the other hand, even in those end uses in which active oxygen releasing agents are used such as in laundry and dishwashing detergents, cleansers and the like, the addition of further quantities of active oxygen may be deleterious. For example, indiscriminate addition of active oxygen contaning compounds to detergents can result in destruction of or damage to fabrics, optical brighteners, fabric dyes, perfumes, disinfectants and other readily oxidizable organic ingredients in the detergent compositions. Use of active oxygen containing compounds in dishwashing detergents containing citrate or nitrilotriacetate sequestering agents will result in an oxidative attack of the peroxide on the organic moieties. No such results arise when the products of this invention are used since they either contain no active oxygen or else only harmless residual amounts as an impurity.

The properties of the products of this invention further represent a significant advance in the art, particularly when compared against the properties of the most closely related prior art compositions as disclosed, for example, in U.S. Pat. No. 3,687,640. The aggregated hydrated sodium silicate powder products of that patent have a general bulk density within the range of from about 0.32 g./cc. to 0.8 g./cc.; however their surface areas are a factor of three lower on the average than the surface areas of the instant products; their absorptivity is 2 to 3 times lower as determined by mercury porosimeter measurements; they have substantially no porosity lower than 10 microns while the products of this invention possess a large amount of relatively fine-pore structure below a pore diameter of 10 microns; and they are noticeably slower to dissolve in water than are the products of this invention.

The Process

In the process of this invention, discrete, hydrated alkali metal silicate particles are contacted with an aqueous solution of hydrogen peroxide. The hydrogen peroxide is allowed to diffuse into and become part of the hydrated amorphous silica structure. The silicate is then heated to a temperature of about 60°C to bring about the destruction of the hydrogen peroxide and the liberation of oxygen from the internal structure of the silicate. A threefold or more increase in surface area, a higher rate of solution and lower bulk density are thus achieved in a product composed of minute, grape-like clusters which form from the original, larger spherical particles of hydrated alkali metal silicate powder. To achieve such a structure, a number of processing variables must be critically controlled. These include the amount of hydrogen peroxide and the concentration of hydrogen peroxide in the aqueous hydrogen peroxide solutions with which the silicate particles are contacted, the temperature at the time of contact and during diffusion of the peroxide into the silicate, the length of time after contact and before the temeperature is elevated and the time and temperature used to destroy the peroxide after it has diffused into the hydrated alkali metal silicate structure.

The process of this invention is unique in combining the agglomeration of fine particles into larger granules while simultaneously substantially increasing the specific surface area of the powders. Most prior art processes as typified by the process disclosed in U.S. Pat. No. 3,687,640, inevitably cause a decrease in specific surface area, or at best the maintenance of the original area, because at least the area at which the particles are joined is lost as available surface for absorption.

Surprisingly, by the process of this invention agglomeration of particles on a macroscopic scale (i.e., dimensions of the order of 50 to 1,000 microns) is achieved as well as new surface area on a microscopic scale (i.e., 0.5 to 50 microns dimensions). The new surface created greatly exceeds that lost via agglomeration, so that an actual several-fold increase in surface area can be obtained.

The processes of the invention are also useful in achieving agglomeration of already highly absorbent high surface area alkali metal silicate powders at substantially lower temperature than those required in other processes such as the process disclosed in U.S. Pat. No. 3,687,640. Relatively small amounts of peroxide near the lower limit of 2% based on the weight of hydrated alkali metal silicate which do not necessarily lead to large increases in surface area are sufficient in such instances. The processes of the invention essentially prevent the loss of an existing high surface area, absorbent, porous, structure while achieving agglomeration into granules.

Polish Pat. No. 40,766 issued to Stanislav Karczewski, Apr. 1, 1958, discloses adding up to 15% by weight of hydrogen peroxide to a hydrated sodium silicate waterglass containing about 25% water. The hydrogen peroxide-silicate mixture is held for 12 hours during which it very slowly swells and coagulates. The product is then dried at a temperature not exceeding 30°C. for about 3 hours to yield a product having a high active oxygen content due to the quantity of peroxide contained in its interstices. Because of the very long diffusion times and the fact that the silicate is never taken to a high enough temperature to rapidly decompose the hydrogen peroxide, the rapid evolution of oxygen gas with the corresponding formation of multicellular, grape-like, high surface area structure in accordance with this invention never takes place. As a matter of fact, because no care is taken to avoid heat build-up and premature decomposition of peroxide, agglomeration into one undifferentiated "bread dough" formation occurs. If this congealed mass were heated to destroy the peroxide, the temperature would unavoidably increase to the point at which steam is generated since adequate heat transfer out of such a structure is not possible.

The processes of this invention are applicable to a variety of alkali metal silicate substrates. Either hydrated or anhydrous particles may be employed, and the mol ratio of silica to alkali metal oxide may vary from about 1:1 to 3.75:1. For many uses, particularly in surfactant applications, the lower ratio silicates having a mol ratio between 2:1 and 3:1 are highly preferred. This creates some complications in applying the process of the case since the decomposition of hydrogen peroxide is greatly accelerated in more alkaline media, particularly as the pH gets as high as 12. For this reason, silicates having ratios between 1:1 and 2:1 are not preferred substrates, although they can be employed in special cases. Ratios higher than 3:1 are not preferred, because the rate of solution of high ratio silicates is substantially slower than that of lower ratio silicates. In washing operations, particularly in cold water, this can be an important property. Higher ratio silicates are also less preferred in many binding applications because of their higher viscosity at a given solids concentration. For example, a ratio of 3.25:1 to 3.75:1 has a viscosity several times higher than the viscosity of ratios between 2:1 and 3:1.

Hydrated alkali metal silicates are preferred substrates compared to anhydrous. While useful products can be obtained from anhydrous particles treated by the processes of this invention, the rate of diffusion of the peroxide into anhydrous materials is relatively slow, adding to the expense of preparing the products because of the longer residence times and larger equipment required. In general, it is preferred that the products to be treated contain at least 5% by weight of water of hydration, preferably up to 25%. Higher water contents are not preferred since the silicate particles become excessively plastic and the open, high surface area structure achieved by the processes of the invention can be easily lost in subsequent processing steps such as drying and other handling operations.

The particle size is a factor of importance. It is preferred that the particles to be treated by the process of this invention be of a very fine size. Preferably the particle size should be less than 60 U.S. Standard mesh (250 microns), and it is more highly preferred that they be between 200 U.S. Standard mesh (74 microns) and about ½ micron in size. This is particularly important when dealing with anhydrous particles, since diffusion times for an anhydrous particle of large particle size are exceedingly slow.

It is also important that the alkali metal silicate particles to be treated by the processes of the invention do not contain substantial quantities of transition metal ions as impurities. Elements such as copper, iron, nickel and so on either in the metallic state or as oxides, should be at as low a level as possible, preferably not greater than 500 parts per million, because such materials are extremely active catalysts in bringing about the destruction of hydrogen peroxide. Substantial quantities or greater than 500 ppm will lead to a premature destruction of the peroxide before it has an opportunity to diffuse into the structure of the alkali metal silicate particles.

Finally, it is important that the silicate particles of the invention comprise essentially discrete particles as opposed to large aggregated masses of particles. Treatment of aggregated masses or excessive aggregation which might occur due to the improper operation of the processes of the invention can be extremely harmful. If a large mass of aggregated particles is treated with hydrogen peroxide, the exothermic decomposition of peroxide can cause either localized or general evolution of heat and a resultant rapid increase in temperature to the point where the hydrogen peroxide is destroyed before it has an opportunity to diffuse into the structure of the alkali metal silicate particles. Thus it is important to get finely divided, discrete powders, and to operate the processes of the invention in such a fashion as to maintain these powders in a relatively discrete form throughout the operation. Aggregates larger than 1 cm. in diameter should not be allowed to form because of this problem.

In the process of this invention, the quantities of hydrogen peroxide based on the weight of hydrated amorphous alkali metal silicate can range from as little as 2% by weight to as high as 100%. Lower quantities of hydrogen peroxide do not result in a sufficient change in the bulk density, nitrogen surface area, and absorptivity, whereas quantities higher than 100% are seldom necessary, even to prepare particles of exceedingly low bulk density, such as 0.1 g./cc.

The hydrogen peroxide concentration in aqueous solution ranges from about 5 to 100%, preferably 15 to 70% by weight. Concentrations of lower than 5% require the addition of large amounts of water which must then be evaporated off. This is disadvantageous because of the sensitivity of hydrated alkali metal silicates to sintering which causes a loss of surface area. While 100% peroxide can be used very effectively in this application, the hazards associated with handling and using such concentrated peroxide solutions make this a less preferred concentration. The preferred concentrations of from 15 to 70% hydrogen peroxide are safe, effective and easy to handle.

The concentration of peroxide in the process of the invention is not only important to provide sufficient oxygen to expand the structure, but it also determines the rate at which the decomposition occurs. This is because peroxide decomposition in this system is a second order chemical reaction. Consequently, a molecule of hydrogen peroxide and a molecule of peroxide ion interact to form the transition complex which later decomposes into oxygen and water. The rate at which decomposition occurs at any given temperature is thus proportional to the square of the peroxide concentration. If the concentration of aqueous peroxide gets too low, as for example substantially below 2%, based on the weight of the total composition, the rate of peroxide decomposition also gets quite slow. It should be recognized that with such second order reaction kinetics, cutting the peroxide concentration by a given factor cuts the rate of the decomposition by the square of that factor. Thus, for example, if the concentration is decreased by a factor of five, the reaction rate is decreased by a factor of 25-fold. It is for this reason that relatively low concentrations which were taught for decomposition of a peroxide in some of the aqueous solutions of the prior art cannot be employed in the process of this invention. The hydrated silicate solid material which is being processed has viscosities very much higher than most aqueous solutions, and their pastes and reaction rates are substantially slower because of this factor. Thus, a 2% concentration of peroxide represents about the minimum level which will give sufficiently rapid decomposition to expand the structure to a satisfactory degree.

The hydrogen peroxide treatment of this invention may be used with any desired alkali metal silicate composition having any desired degree of hydration provided that the composition is free flowing. The water of hydration expressed as percent by weight water based on the weight of the composition is generally 18 to 25%. The ratio of silicon dioxide to alkali metal oxide in the silicate generally ranges from 1:1 to 3.75:1. A ratio of from 2:1 to 3:1 is best for surfactant manufacture and is preferred.

While, as described above, the ranges of operability of the processes of this invention are relatively broad, it must be understood that the extremes of these ranges cannot always be simultaneously applied. For example, one may, if desired, employ finely divided anhydrous silicate starting materials, and one may, if desired, use concentrations of hydrogen peroxide as high as 100% and one may use concentrations of hydrogen peroxide as low as 2% by weight, based on the weight of the silicate. It would not be possible, however, to do all of these simultaneously. That is, one could not expand anhydrous silicates using 100% peroxide at the rate of 2% by weight of the silicate. The success of the processes of this invention depends upon bringing the hydrated silicate particles being treated to the right internal viscosity such that it is plastic enough to expand as a result of the pressure of oxygen gas created by the hydrogen peroxide decomposition, but sufficiently internally viscous that the expanded structure thereby created does not rapidly collapse. Successful operation of the processes of this invention thus require certain relationships between the variables of chemical composition and processing conditions to be maintained which are defined by the internal viscosity of the hydrated silicate solid particles in the peroxide-treated free flowing mass.

The viscosity of hydrated amorphous silicate structures is influenced by a number of factors, including the total liquid content (i.e., the sum of the hydrogen peroxide and water available), the $SiO_2/Na_2O$ ratio, and the temperature. In general, the viscosity is lower the higher the liquid content, the lower the $SiO_2/Na_2O$ ratio, and the higher the temperature. Substantially identical considerations apply to mol ratios of $SiO_2$ to potassium or lithium oxide.

Although the factors influencing the viscosity of amorphous alkali metal silicate-liquid systems are complex, fortunately the viscosity itself is relatively easily measured experimentally. This can be determined by techniques normally used for measuring the viscosity of highly viscous systems, such as the falling ball viscosimeter method or the rising bubble method. The rate of elongation of solid fibers of hydrated silicate glass of the composition can also be used to estimate the viscosity. The viscosity range which can be used broadly in the processes of the invention is from 5,000 to 100,000 poise, with the most preferred being from 8000 to about 50,000 poise.

Viscosities substantially lower than the lower limit do not work satisfactorily in the processes of the invention, because the collapse of the structure after having been expanded by the hydrogen peroxide decomposition is too rapid. Thus, pores, even if formed, are closed and sinter at too rapid a rate.

Viscosities higher than 100,000 poise are not satisfactory because the silicate-liquid system is too brittle and expansion of the structure into the required open-pored system would require too high an oxygen decomposition pressure. For the preferred 2:1 to 3:1 ratio silicates of the invention and operating near the preferred 60°C. decomposition temperature, the appropriate liquid composition to give the correct viscosity is from about 25% by weight to about 45% by weight. The most preferred range is from 32.5% to 42.5%. That is, the sum of the weight percent of hydrogen peroxide and water in the system should be within this range. Above 45% by weight of total liquids (or total volatiles), coalescence and collapse of the structure, accompanied by excessive agglomeration, takes place. Below 25% by weight in this general temperature range, the structure simply does not expand sufficiently to give the degree of porosity required for the products of this invention. In computing total liquid, the initial hydrate water of hydrated silicate starting materials should be added to that introduced along with the hydrogen peroxide. Alternatively, the product after spraying with the peroxide solution can be fired to above 600°C. and the loss in weight or total volatiles is equal to the total liquid content.

The hydrogen peroxide may be added, applied, sprayed onto or in any other manner introduced to the silicate free flowing powder or granules. Generally, the hydrogen peroxide is sprayed at a temperature of from 0° to 45°C., preferably 0° to 30°C., onto a moving bed of silicate granules using any standard device for spraying a liquid onto a solid. In one particularly efficient operation, the silicate is placed inside a rotating drum mixer having the shape of an elongated cylinder, the interior walls of which are scraped by a rotating screw which simultaneously mixes the contents and moves them slow along the length of the cylinder. The hydrogen peroxide solution may be sprayed onto the silicate granules by jets located near the entrance of the cylinder. The particles thus contacted are then conveyed through the cylinder which may have a residence time of from 5 minutes to several hours. The cylinder preferably contains a zone in which the temperature can be controlled within the range of 0° to 45°C., preferably 0° to 30°C., during the diffusion time in which the hydrogen peroxide diffuses into the inner hydrated alkali metal silicate structure. If desired, the granules may be subjected to a current of dry air or inert gas may be blown over the tumbling powder in the mixer.

If the temperature is raised slowly, the decomposition of hydrogen peroxide is correspondingly slow and diffusion of the oxygen resulting from the decomposition will take place through the thin walls of the bubbles which form without rupturing the bubble wall. Such a slow rate of increase of the temperature at this point is undesirable, since there is always a competing reaction of sintering tending to close the pores and lose porosity which must compete with the creation of new pores resulting from the decomposition of the hydrogen peroxide. As noted previously, the success of the process of the invention depends upon achieving a relatively plastic condition leading to good expansion on decomposition of the peroxide, followed by the "freezing" of this structure by relatively rapid removal of water once the structure has been expanded. As the volatiles content (i.e., $H_2O$ and $H_2O_2$) drops below 30%, and particularly below 25%, the system will become quite rigid and the rate of sintering will not result in a serious loss of the structure achieved. It is for this reason that it is necessary throughout the process to keep agglomeration at a minimum. If, as in several prior art procedures, the whole mass of silicate is allowed to coalesce to form one large unitary structure, it becomes almost impossible to effect either mass or heat transfer sufficiently rapidly to avoid non-uniform and relatively nonporous structures as discussed hereinbefore. If the amount of peroxide in the silicate is fairly high and the temperature is increased rapidly, the walls will be ruptured and a more highly absorbent structure will be obtained.

It is usually preferred that the powder is tumbled or mixed while the addition, diffusion and decomposition of hydrogen peroxide is carried out to avoid the formation of excessively large agglomerates.

After the peroxide and the bulk of the water associated with it have been destroyed and removed, it is possible to dry the silicate at somewhat higher temperatures since excessive agglomeration due to heat liberated by peroxide decomposition will no longer occur. The water content at this point should not exceed 30% by weight, however. At higher water contents the silicate is too plastic to be dried at temperatures above 60°C. without excessive sintering and loss of porosity and absorbency. Once the water content is below 30% the drying temperature can be raised to as high as 100°C. or even as high as 200°C. as long as the volatiles content is below about 25%. Temperatures between 60° and 200°C. can also be used for short periods of time to complete decomposition of peroxide.

IF desired, the bulk density of the product may be lowered still further by repeating the process of this invention sequentially. In other words, the powder product can be recontacted with additional aqueous hydrogen peroxide solution at 0° to 45°C., the peroxide can then be allowed to diffuse into the alkali metal silicate structure and then destroyed by heating and the process can be continued until the desired bulk density is achieved. Such sequential processes need not be consecutive. For example, the silicate can be subjected to one or more treatments, stored and/or shipped and then further treated in accordance with this invention at some later time.

The products of this invention are amorphous alkali metal silicate materials. The art is familiar with low ratio crystalline water-soluble sodium silicates such as sodium metasilicates, sodium orthosilicates, and sodium sesquisilicates. These very low ratio (alkaline) silicates are rapidly water-soluble, but their high alkalinity makes them unsuitable for many uses, including uses in general purpose detergents. Silicates having mol ratios of $SiO_2$ to $Na_2O$ within the range of the preferred products of this case, that is from a mol ratio of 2:1 to 3:1, cannot be crystallized and exist, so far as is known, only as amorphous materials. The amorphous nature can be determined by examination with X-rays. When so examined, the products of the invention show only broad diffuse rings characteristic of amorphous materials.

While the invention has been discussed primarily with reference to sodium silicates, it is to be understood that the invention is applicable to any alkali metal silicate including, for example, sodium, potassium and lithium silicates at the $SiO_2$:alkali metal oxide ratios set out hereinbefore.

The highly absorbent products of this invention are particularly important in the formulation of nonpolluting detergents since they can absorb the nonionic detergent into their structures thereby allowing the manufacturer to avoid the air pollution which results when the nonionic fluid is put through a spray tower. The products of this invention can also be used to prepare very low bulk density refractory powders of silica for use as catalyst supports and as insulating materials by acidifying the silicate with carbon dioxide gas, or with a suitable mineral acid such as aqueous HCl, sulfuric acid, nitric acid, and the like. The salt, such as the carbonate, chloride, sulfate and so on formed by the neutralization reaction can then be leached out of the silica gel pseudomorph of the original alkali metal silicate product and the product dried to give a refractory silica structure similar in shape and physical form to the starting silicate.

The invention is further illustrated but is not intended to be limited by the following examples in which all parts, percentages and ratios are by weight unless otherwise specified. The tests described in Example 1 are also used in characterizing the products described in the subsequent examples.

EXAMPLE 1

One hundred grams of a spray-dried, hydrous silicate having a 2.44 to 1 $SiO_2$ to $Na_2O$ weight ratio and containing 19.81% water, and having a bulk density of 0.61 g./cc., a nitrogen surface area of 1.4 m.$^2$/g., and 70% of which passed a 100 mesh screen, were mixed in a Hobart mixer (a bread dough type of mixer typically used in baking operations), with 29.4 grams of 34% hydrogen peroxide aqueous solution, representing 10% $H_2O_2$ based on the weight of the silicate. The hydrogen peroxide aqueous solution was sprayed on the sodium silicate powder while the powder was being mixed at the top speed of the Hobart mixer. Mixing was continued for 10 minutes. The material was then placed in a rotating tumbler and heated to 60°C. over a period of 15 minutes by the use of an infrared lamp and a heat gun. It was then taken to 100°C. over a 5 minute period and held for 5 minutes at 100°C. It was noted that the bulk of the expansion to form an expanded, porous, granular structure occurred within the temperature range of from 60° to 80°C. The material was then passed through a 10 mesh screen, and had the following properties: tamped bulk density was 0.12 g./cc.; the oil absorption, determined by feeding a nonionic surfactant (Neodol ethoxylate 25-12, a Shell Chemical Company linear alcohol ethoxylate comprising a mixture of alcohols having 12 to 15 carbon atoms condensed with twelve mols of ethylene oxide to an average molecular weight of 745, a density of 1.003 and a melting point of 30° to 33°C.) dropwise into a stirred beaker of the product of the invention to the first appearance of a thin film of surfactant on the side of the beaker (beaker test), was 100% by weight. The amount of nonionic surfactant which could be absorbed when heavily loaded was determined by suspending the product of the invention in an excess of nonionic surfactant and filtering to remove the excess. In this instance, it absorbed 218% of its own weight of nonionic surfactant. The nitrogen surface area of this material was 4.15 m.$^2$/g., which is about three times that of the starting material, and its absorption as determined by mercury porosimetry measurements at 15,000 psi pressure was 4.8 cc. of mercury per gram of product.

EXAMPLE 2

One hundred grams of the sodium silicate of Example 1 were mixed with 29.4 grams of a 17% aqueous solution of hydrogen peroxide, representing 5% hydrogen peroxide based on the weight of the sodium silicate powder in a Hobart mixer for a period of 10 minutes as described in Example 1. The product was then treated in the rotating dryer of Example 1, and given the same temperature treatment schedule. After the product of the invention was screened through a 10 mesh screen, its tamped bulk density was 0.17 g./cc.; it absorbed 95% of nonionic surfactant before the surfactant appeared on the side of the beaker in the beaker test described in Example 1, and 196% using the immersion and filtration test described in Example 1. The nitrogen surface area of this material was 2.74 m.²/g. and the total porosity determined at a pressure of 15,000 psi by a mercury porosimetry test was 3.18 cc. of mercury per gram of sample.

EXAMPLE 3

One hundred grams of the sodium silicate of Example 1 were treated with 18.2 grams of a 19.6% hydrogen peroxide solution, representing 2.5% hydrogen peroxide based on the weight of the hydrated silicate powder. This was mixed and heat-treated as described in Example 1. The product of the invention in this instance had a tamped bulk density of 0.22 g./cc., showed a 70% surfactant absorption in the beaker test and a 100% absorption by the contacting and filtration test, both as described in Example 1. The nitrogen surface area was 2.78 m.²/g., and the internal porosity as determined by mercury porosimeter at 15,000 psi pressure was 2.08 g./cc.

EXAMPLE 4

This example illustrates the applicability of the process of the invention to a silicate having a 3.25 ratio of $SiO_2$ to $Na_2O$. About 1,000 grams of a spray-dried hydrous silicate having a 3.25 to 1 $SiO_2$ to $Na_2O$ weight ratio, a water content of 19.8%, and a nitrogen surface area of 1.0 m.²/g. were mixed in a large Hobart mixer with 357 grams of a 28% hydrogen peroxide solution. This represents 10% of hydrogen peroxide based on the weight of the hydrated silicate. The result was heated with stirring to a powder temperature of 65°C. over a period of 15 minutes and was then heated with stirring to a temperature of 100°C. over an additional 15 minutes. During the second heating the material expanded and agglomerated to form a typical product of the invention which, after screening through a 10 mesh screen, gave a tamped bulk density of 0.21 g./cc., a 95% absorption of nonionic surfactant by the beaker test, a 138% absorption by the contacting and filtering test, a residual active oxygen level of 0.4% and a water content of 13.5%.

EXAMPLE 5

Nine hundred grams of a spray dried sodium silicate powder having a $SiO_2$ to $Na_2O$ ratio of 2 to 1, a water content of 18%, and an initial nitrogen surface area of 1.2 m.²/g., were mixed with 200 grams of 40% aqueous hydrogen peroxide solution, representing 9% $H_2O_2$ based on the weight of the silicate, in a large mixer and mixed for 10 minutes as in Example 1. The result was placed in a large tumbling rotary dryer and heated to 60°C. over a period of 1 hour, during which time substantial expansion and agglomeration occurred. It was then taken to 100°C. in 45 minutes and held there for 10 minutes. After screening through a 10 mesh screen the product had a tamped bulk density of 0.18 g./cc., a surfactant absorption of 100% based on weight of product in the beaker test as described in Example 1 and 150% in the filtration test. It contained 0.32% active oxygen, had a 0.31 g./cc. bulk density when loaded with 100% of surfactant and a water content of 14.74%. Its nitrogen surface area was 3.99 m.²/g.

EXAMPLE 6

About 100 grams of a solid hydrated amorphous sodium silicate having a bulk density of 0.7 g./ml., a $SiO_2/Na_2O$ ratio of 3.22 and a moisture content of about 17% were introduced into a one liter stainless steel beaker fitted with baffles. The sodium silicate was tumbled at 35 rpm at an angle of about 30° compared to the horizontal and 47.1 grams of a finely divided spray of a 70% aqueous solution of hydrogen peroxide containing 1 gram of magnesium sulfate heptahydrate were introduced to the sodium silicate at a temperature of about 40°C. The temperature was maintained by heating the silicate with hot air during the peroxide addition. When all of the peroxide had been added, the sodium silicate had expanded in volume and become light. Granules of agglomerated silicate of approximately 35 mesh screen size were obtained. The granules were dried at room temperature for 1 hour and then at 50°C. for 1 hour, the temperature being raised from room temperature to 50°C. as rapidly as possible (about 7°C. per minute). The resulting product had a bulk density of 0.34 g./ml. and a residual active oxygen content of 2.8% as determined by the following test:

About 0.3 to 0.5 gram of silicate was weighed accurately and transferred into well-stirred acidified water (10 ml. of 25% $H_2SO_4$ in 200 ml. water) in a 400 ml. beaker. After all of the solid dissolved, 1 to 2 ml. of 2% ammonium molybdate solution are added. Immediately thereafter 15 ml. of 25% KI solution are added and stirring was continued for two minutes before the liberated iodine was titrated against 0.1 normal sodium thiosulfate using 5 to 10 ml. of 1% starch solution as the indicator. The end point is a color change from blue to colorless. % active oxygen = (ml. of .1N thiosulfate × 0.08)/sample weight in grams.

The produce was then placed in a 60°C. oven having a controlled relative humidity of 85% for one hour. The final product contained no peroxide as shown by analysis for active oxygen and had the following characteristics:

Stereoscan electron micrographs showed the amorphous products to consist of grapelike clusters in which the aggregate size ranged from a minimum of 15 microns to approximately 1000 microns, with the ultimate units (the grapes in the cluster) ranging in particle size from 1 micron to 10 microns. The shells of these spherical clusters were broken in many places, so that the internal porosity within the grapelike clusters was available for absorption.

The water content was 17.5% and the specific surface area as measured by nitrogen absorption was 2.76 m.²/g. The ASTM oil absorption was 1.5 grams of linseed oil per gram of sample. Mercury porosimeter measurements showed a range of pore volumes of from about 60 microns to 0.02 microns, with a total absorption of 0.92 cc. of mercury per gram of product and the quantity of transition metal impurities as measured by atomic absorption amounted to less than 200 ppm. Essentially 100% of a one gram sample dissolved in 100 cc. of water in two minutes at room temperature. This rate of solution was such that no undissolved material remained upon filtration.

This product absorbed 60% of its own weight of Neodol Ethoxylate 25–12 (a Shell Chemical Company linear alcohol ethoxylate comprising a mixture of alcohols having 12 to 15 carbon atoms condensed with twelve mols of ethylene oxide to an average molecular weight of 745 a density of 1.003 and a melting point of 30° to 33°C.) nonionic surface active agent before the nonionic surfactant was deposited on the walls of the glass beaker used for mixing the nonionic surfactant with the porous absorbent silicate.

The tamped bulk density was 0.34 g./cc., which was unchanged from the peroxide containing intermediate product obtained before heating to destroy the peroxide.

EXAMPLE 7

One hundred grams of sodium silicate having a bulk density of 0.73 g./cc., an $SiO_2$ to $Na_2O$ weight ratio of 2 to 1 and a water content of about 18% were sprayed as described in Example 1 with 24.1 g of 70% hydrogen peroxide containing 1.8 g. of magnesium sulfate heptahydrate. From an initial temperature of 25°C. the temperature of the reaction mixture rose to a temperature of about 40°C. during the peroxide addition. The product expanded as in Example 6 and agglomerated into approximately 35 mesh granules with no particles greater than approximately 1 cm. in diameter. Following the reaction with peroxide, the product was dried at 50°C. for 3 hours as described in Example 1. This intermediate product had an active oxygen content of 4.30%. The tamped bulk density at this point was 0.145 g./cc. To lower the active oxygen content, the product was then heated in an air circulating oven at 60°C. for 2 hours at a relative humidity of 85%. Substantially all of the peroxide was destroyed so that the active oxygen content was less than 1.33%.

The amorphous product was examined by electron stereoscan micrography and showed even smaller ultimate units in grapelike clusters than the product of Example 6. The aggregate size, however, was approximately the same as in Example 1. The product had a water content of 21.2% a specific nitrogen surface area of 5.28 m.$^2$/g. an ASTM oil absorption of 2.8 g. of oil per gram of sample, a nonionic surfactant absorption of 95% of the nonionic surfactant of Example 6 based on the weight of the product, less than 200 ppm. of transition metal impurities, a rate of solution of 100% and a mercury absorption as measured by mercury porosimetry of 1.95 cc. of mercury per gram of sample. The pore diameters were essentially linear between a diameter of 80 microns and a diameter of 0.2 microns. The tamped bulk density after destruction of the peroxide was essentially identical with that measured for the intermediate product.

EXAMPLE 8

One hundred fifty grams of a hydrated amorphous sodium silicate having an $SiO_2$ to $Na_2O$ weight ratio of 2, an 18% water content and a bulk density of 0.7 g./cc. were contacted sequentially using the equipment and procedure described in Example 6 with a total of 10% by weight of hydrogen peroxide based on the weight of the hydrated amorphous silicate supplied in the form of a 30% peroxide solution. In the first addition, 5% of the peroxide was introduced at 30°C. The temperature rose to 60°C. and the silicate expanded and became aggregated. The silicate was then heated at 60°C. to destroy the peroxide. The second half of the peroxide was applied after the silicate had been cooled back to 30°C. and the above procedure was repeated. The resulting product was vacuum dried at 60°C. and had a water content of 18% by weight and an active oxygen content of 0.8%.

The amorphous silicate product had a tamped bulk density of 0.31 g./cc., a 100% rate of solution, less than 200 ppm. of transition metal impurities and stereoscan elelctron micrographs showed that it consisted of spheroidal, grapelike clusters as described in Example 1. The particle size was less than 60 mesh with an aggregate size considerably less than 1 cm. in diameter. The mercury porosimeter data showed a striking bimodal distribution of pores. One group of pores was in the general size range of 80 microns to 20 microns, which was essentially identical with the porosimetry curve of the starting spray-dried silicate. The porosity involved in this part of the porosimetry curve was about 0.4 g./cc. A second family of pores with an average pore diameter of about 2 microns, and amounting to an additional 0.8 g./cc., was clearly the result of the peroxide treatment. The total porosity was thus 1.20 cc. of mercury per gram of sodium silicate.

The ASTM-D-281-31 oil absorption was 1.00 g./g. of sample compared to 0.4 g. for the starting spray-dried silicate. The specific surface area of the product as determined by nitrogen absorption was 3.16 m.$^2$/g., compared with a surface area of 1.14 m.$^2$/g., for the starting spray-dried silicate powder. Thus, the absorption as measured by mercury porosimetry measurements had increased by a factor of three. The absorption as measured by oil absorption was increased by a factor of more than two and the bulk density was decreased by a factor of more than two by treatment with only 10% by weight of peroxide. The nonionic surfactant absorption using Neodol Ethoxylate 25-12 to the first appearance of oil on the walls of the glass beaker in which the absorption experiment was run was 60% by weight of the product or more than six times that of the starting material which absorbed only 10% of its own weight of the same nonionic surfactant.

EXAMPLE 9

Three thousand fifty-two grams of a 3.25 $SiO_2$ to $Na_2O$ weight ratio anhydrous sodium silicate powder were mixed in a blender with a solution of 656 grams of 50% sodium hydroxide and 320 grams of water. After mixing for about 5 minutes the composition was placed in a Teflon lined stainless steel pressure cooker which was placed in an oven at 100°C. and held at that temperature for 16 hours. Upon cooling a large cake of hydrated silicate having an $SiO_2$ to $Na_2O$ ratio of 2 was obtained. This was put through a jaw crusher and then through a micropulverizer until the hydrated amorphous silicate powder was —60 mesh. One thousand grams of the —60 mesh powder were placed in a 5 gallon cement mixer equipped with internal baffles and sprayed with a 35% hydrogen peroxide solution containing 1% of magnesium sulfate heptahydrate in an amount sufficient to deposit 10% by weight of peroxide based on the weight of the silicate powder. This was done in two stages as described in Example 8, with 5% being applied at 30°C. The temperature was then raised to 60°C. to destroy the peroxide, the reactor was cooled to 30°C., the remaining peroxide was applied and the silicate was again heated to 60°C. to destroy the peroxide. Agglomerated granules having an average 35 mesh particle size, a water content of 20.19% and a tamped bulk density of 0.43 g./cc. were thus prepared. The nitrogen surface area of this powder was 2.78 m.$^2$/g., which is approximately 2 times the surface area of the starting hydrated ground powder. The final bulk density of 0.43 g./cc. is obtained compared to the 1.3 g./cc. bulk density of the starting powder. The absorption of nonionic surface active agent described in Example 1 was 40% by weight based on the weight of the hydrated amorphous silicate product compared to less than 10% by weight absorption of the same nonionic for the starting ground, hydrated, amorphous silicate powder. In this case, as in the preceding example, essentially no peroxide remained as active oxygen in the product and a 100% rate of solution with less than 200 ppm. of transition metal impurities was obtained. Mercury porosimeter measurements showed a total absorption of 0.8 cc. of mercury per gram of product.

EXAMPLE 10

This example shows the advantage of starting with a finer particle sized spray-dried material.

A hydrated sodium silicate powder having an $SiO_2$ to $Na_2O$ weight ratio of 2.44 containing 19.81% water and having a nitrogen surface area of 1.4 m.$^2$/g. was screened on a mechanical screen and the −200 mesh fraction representing about 5% of the total, was recovered. One hundred fifty grams of this material were contacted with two 25 gram portions of 30% aqueous hydrogen peroxide as described in Example 9 while tumbling the spray-dried silicate powder in the equipment described in Example 1. The resulting product was heated at 60°C. while tumbling until the destruction of the peroxide was substantially complete as indicated by analysis for the active oxygen content. It was dried in an air circulating oven at 40°C. for 4 hours and then dried in a vacuum oven for 2 hours at 45°C. The bulk density of the amorphous product was 0.26 g./cc., the rate of solution was 100% and less than 200 ppm. of transition metal impurities were present. The absorption of the nonionic surfactant described in Example 1 was 85% by weight, the nitrogen surface area was 5.23 m.$^2$/g., and examination by stereoscan electron micrograph showed a porous, sponge-like structure in which the grapelike clusters had coalesced into one open, spongy network. The ultimate units comprising the network of spheroidal particles averaged about one micron in size. The surface area was 3 to 4 times as great as that of the starting material and the nonionic absorption is approximately 8.5 times as great. The water content was 24.2% and mercury porosimeter measurements showed a total absorption of 2.0 cc. of mercury per gram of product.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as set forth in the claims.

What is claimed is:

1. Amorphous, water-soluble agglomerates of spheroidal alkali metal silicates having a mol ratio of $SiO_2$ to alkali metal oxide of 1 to 3.75, a specific nitrogen surface area between 2.5 and 7 m.$^2$/g., a bulk density of less than 0.5 g./cc., an absorbency for nonionic surfactants of from 70% to 400% by weight of silicate, as measured by the weight percent of a linear alcohol ethoxylate nonionic surfactant comprising a mixture of alcohols having 12 to 15 carbon atoms condensed with twelve mols of ethylene oxide to an average molecular weight of 745, a density of 1.003 and a melting point of 30° to 33°C. that can be added to a given weight of alkali metal silicate beofre there is a sign of unabsorbed surfactant relative to the weight of silicate; a maximum water content of 25% by weight and a maximum active oxygen content of 1.33% by weight.

2. The alkali metal silicates of claim 1 having an $SiO_2$ to alkali metal oxide mol ratio of 2 to 3.

3. The alkali metal silicate of claim 1 having a bulk density of less than 0.3 g./cc.

4. The alkali metal silicate of claim 1 having from 15 to 20% by weight water content.

5. The alkali metal silicates of claim 1 having an internal porosity measured by mercury porosimetry of from 0.7 cc. to 5 cc. of mercury per gram of the silicate at a pressure of 15,000 psi.

6. The alkali metal silicates of claim 1 having at least a 90% solubility in water.

7. The alkali metal silicates of claim 1 wherein the alkali metal is sodium.

* * * * *